(12) United States Patent
McPhalen et al.

(10) Patent No.: US 8,258,768 B2
(45) Date of Patent: Sep. 4, 2012

(54) LOW EMI PRODUCING SWITCH-MODE POWER SUPPLY WITHIN AN INTELLIGENT ELECTRONIC DEVICE

(75) Inventors: Erin McPhalen, Victoria (CA); Shawn Balding, Victoria (CA)

(73) Assignee: Schneider Electric USA, Inc., Palatine, IL (US)

( * ) Notice: Subject to any disclaimer, the term of this patent is extended or adjusted under 35 U.S.C. 154(b) by 762 days.

(21) Appl. No.: 12/334,058

(22) Filed: Dec. 12, 2008

(65) Prior Publication Data
US 2010/0149842 A1    Jun. 17, 2010

(51) Int. Cl.
*G05F 1/00* (2006.01)
(52) U.S. Cl. ........................................................ 323/283
(58) Field of Classification Search .................... 363/39, 363/41; 323/282, 283, 284, 288
See application file for complete search history.

(56) References Cited

U.S. PATENT DOCUMENTS

| 4,484,034 | A | * | 11/1984 | Ferrieu et al. | 379/392 |
| 4,740,887 | A | * | 4/1988 | Rutenberg | 700/79 |
| 5,459,392 | A | | 10/1995 | Mandelcorn | |
| 6,204,649 | B1 | | 3/2001 | Roman | |
| 7,177,166 | B1 | | 2/2007 | Kris | |
| 7,440,296 | B2 | * | 10/2008 | Berghegger | 363/21.08 |
| 7,471,072 | B2 | * | 12/2008 | Fogg et al. | 323/284 |
| 7,499,294 | B2 | * | 3/2009 | Lin et al. | 363/21.06 |
| 7,586,370 | B2 | * | 9/2009 | Morishima | 330/251 |
| 7,671,673 | B2 | * | 3/2010 | Maejima | 330/10 |
| 7,791,908 | B2 | * | 9/2010 | Na et al. | 363/21.02 |
| 2004/0217748 | A1 | | 11/2004 | Andrews | |
| 2007/0019446 | A1 | | 1/2007 | O'Loughlin | |
| 2008/0129263 | A1 | * | 6/2008 | Kotikalapoodi et al. | 323/283 |
| 2008/0316779 | A1 | * | 12/2008 | Jayaraman et al. | 363/74 |

FOREIGN PATENT DOCUMENTS
JP    2009-153292    * 12/2007

OTHER PUBLICATIONS

John Betten, *Reduce EMI by sweeping a power supply's frequency*, EDN, Design Ideas, May 27, 2004, at pp. 92, 94, http:/www.edn.com/article/CA419568.html.
Lin F. et al., *Reduction of Power Supply EMI Emission by Switching Frequency Modulations*, Proceedings of the Annual Power Electronics Specialists Conference, Jun. 20-25, 1993, at pp. 127-134.
ATMEL: "Application Note AVR131: Using the AVR's High-Speed PWMm"; Sep. 30, 2003; URL:www.atmel.com/dyn/resources/prod_docments/doc2545.pdf.
PCT International Search Report for International Application No. PCT/US2009/066937 dated Dec. 7, 2009 (8 pages).
PCT Written Opinion for International Application No. PCT/US2009/066937 dated Dec. 7, 2009 (4 pages).

* cited by examiner

*Primary Examiner* — Adolf Berhane
*Assistant Examiner* — Yemane Mehari
(74) *Attorney, Agent, or Firm* — Nixon Peabody LLP

(57) ABSTRACT

An apparatus for varying the timing of a SMPS, including a microcontroller configured to output a first PWM signal. A converter is coupled to the microcontroller and is configured to receive the first PWM signal and output an analog signal to a SMPS timing capacitor coupled to a SMPS. The analog signal varies the discharge time of the timing capacitor to vary a switching frequency of the SMPS.

24 Claims, 4 Drawing Sheets

LOW EMI PRODUCING SWITCH-MODE POWER SUPPLY WITHIN AN INTELLIGENT ELECTRONIC DEVICE

FIELD OF THE INVENTION

The present invention relates to reducing electromagnetic interference produced by switch-mode power supplies.

BACKGROUND OF THE INVENTION

Electronic devices, such as switch-mode power supplies ("SMPS"), when they operate, emit electromagnetic energy. This electromagnetic energy is often referred to as conducted emissions or electromagnetic interference ("EMI"), as it can interfere with the operation of other electronic devices. The emission of EMI by electronic devices is regulated. For example, the United States Federal Communications Commission ("FCC") promulgates its Part 15 (47 C.F.R. §15) Class A requirements on conducted emissions, which specify EMI emissions requirements applicable to electronic devices to be used in commercial and industrial applications. The FCC also promulgates its Title 15 Class B requirements, which sets EMI emissions requirements for electronic devices to be used in residential applications. Standards organizations also publish recommendations for limits on conducted emissions. An example is standard numbers 16 and 22 published by the International Special Committee on Radio Interference of the International Electrotechnical Commission ("IEC") ("CISPR 16" and "CISPR 22"), which specify conducted emissions limits and methods of measuring conducted emissions.

A SMPS includes one or more switches, such as transistors, that switch on and off at a controlled frequency. The switching on and off of the transistor controls the amount of energy that flows through the transistor in order to maintain a controlled voltage or current. One technique of controlling the switching of the transistor is to use pulse width modulation ("PWM"), where the period of the switching cycles is maintained constant and the width of the pulses is modulated, or varied, to adjust the amount of energy flowing through the transistor. The constant switching period of a PWM SMPS device, or the switching frequency of a variable-frequency switching device at steady state, can result in the emission of EMI that peaks at certain frequencies, such as the fundamental frequency of the SMPS device, and harmonics of those frequencies. Such peaks can exceed requirements and standards such as the FCC Class A or Class B, or CISPR 16 or 22. Component layout in an electronic device can also impact an electronic device's compliance with regulations. For example, components placed more closely to one another are more likely to interfere with one another, as the strength of the EMI decreases with distance.

Shielding the SMPS device, for example with a copper shield in order to prevent EMI from interfering with other devices, is costly. Moreover, the copper shield can be large relative to the circuit components, taking up significant space. What is needed is a way to reduce the emission of EMI by electronic devices, such as SMPS devices, and in particular PWM SMPS devices, in order to reduce their interference with other electronic devices and in some cases bring them into compliance with relevant requirements and standards.

SUMMARY OF THE INVENTION

According to an aspect of the present disclosure, an apparatus for varying the timing of a SMPS, includes a microcontroller configured to output a first PWM signal. A converter is coupled to the microcontroller and is configured to receive the first PWM signal and output an analog signal to a SMPS timing capacitor coupled to a SMPS. The analog signal varies the discharge time of the timing capacitor to vary a switching frequency of the SMPS.

According to another aspect of the present disclosure, a method of varying the timing of a SMPS includes outputting a PWM signal, converting the PWM signal to an analog signal, and varying the discharge time of a SMPS timing capacitor by varying the charge on the timing capacitor with the analog signal causing a switching frequency of the SMPS to be modified.

According to another aspect of the present disclosure, a system includes a microcontroller configured to output a first PWM signal and a converter coupled to the microcontroller and configured to receive the first PWM signal and output an analog signal. The system also includes a timing capacitor coupled to the converter that is responsive to the analog signal. The analog signal varies the discharge time of the timing capacitor by varying the charge on the timing capacitor. The system also includes a SMPS coupled to the timing capacitor configured to monitor the charge on the timing capacitor and vary the frequency of a second PWM signal in response to the charge on the timing capacitor.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
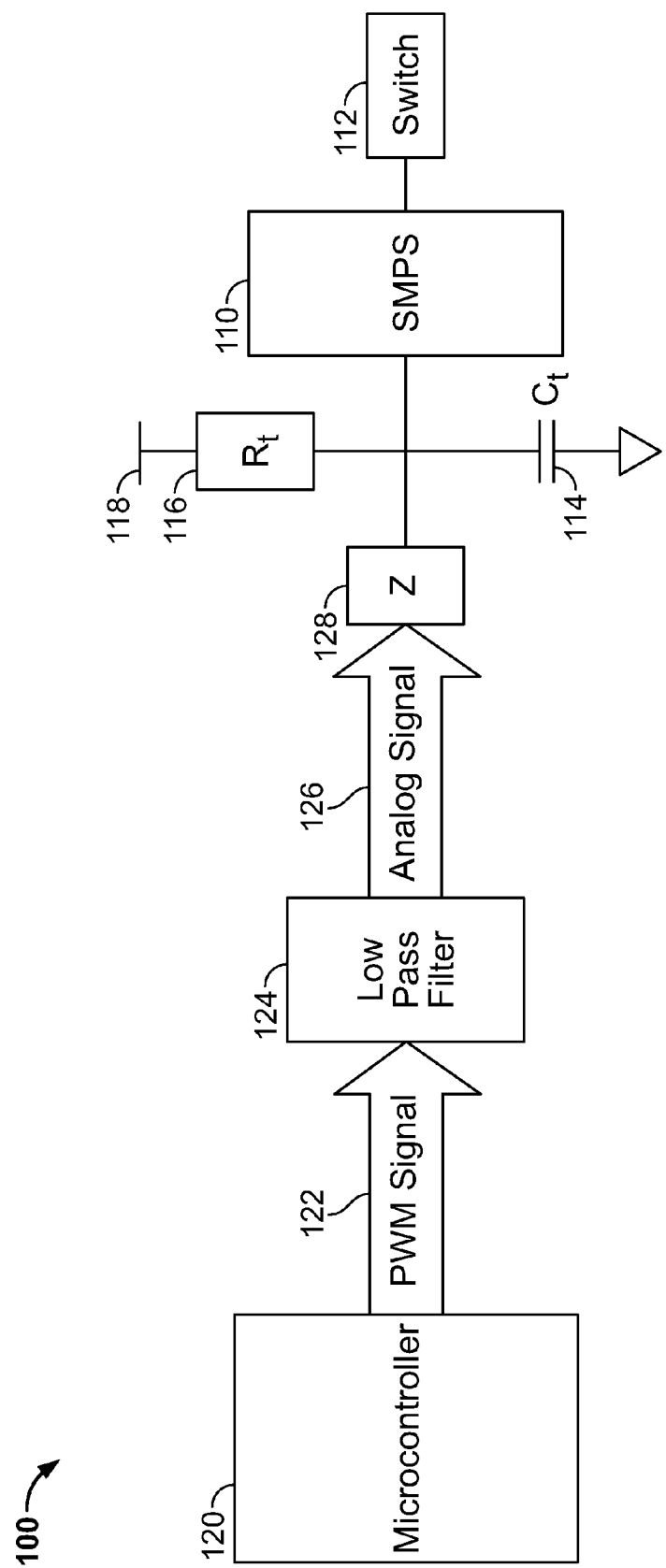
FIG. 1 is a circuit diagram of a system that includes some of the elements used in aspects of the present disclosure.

A switch-mode power supply ("SMPS") can include a SMPS controller and at least one switch that is controlled by the SMPS controller. FIG. 1 shows an electronic device 100 that includes a SMPS controller 110 coupled to a switch 112. The switch 112, can be, for example, a bipolar junction transistor or field effect transistor. The SMPS controller 110 controls the switching frequency of the switch 112, i.e., the frequency at which the switch 112 is turned on. The SMPS controller 110 can be a pulse width modulating ("PWM") controller or a variable-frequency controller. A PWM controller modulates the times that switch 112 turns off in order to vary the widths of the pulses to control the amount of energy flowing through the switch 112. The SMPS controller 110 can be, for example, the ON SEMICONDUCTOR®

UC3845B Current Mode PWM Controller or Texas Instrument Inc.'s UC2844 Current-Mode PWM Controller.

The switching frequency of the SMPS controller 110 is determined by a timing capacitor 114 ($C_t$) coupled to a timing input pin of the SMPS controller 110. The discharge of the timing capacitor 114 is determined by the size of the capacitor, the charge, and the value of a timing resistor 116 ($R_t$) coupled to the timing capacitor 114 and a voltage supply 118. For example, the timing capacitor 114 can be a 220 pF capacitor and the timing resistor can be a 33 KΩ resistor. The SMPS controller 110 can include an internal oscillator (not shown), which allows the timing capacitor 114 to charge up through the timing resistor 116 to an upper value, for example 2.9 V or 3.1 V. The SMPS controller 110 allows the timing capacitor 114 to discharge at a set rate (e.g., 8.3 mA) to a lower value, for example 1 V or 1.2 V. This charging and discharging produces a voltage signal at the timing input pin of the SMPS controller that can be depicted as a ramp. The frequency of the ramp signal can be, for example, 200 kHz. The SMPS controller 110 can divide down this ramp signal, for example to an approximately 100 kHz signal, and use the divide down signal to set a switching frequency.

Figure 2:
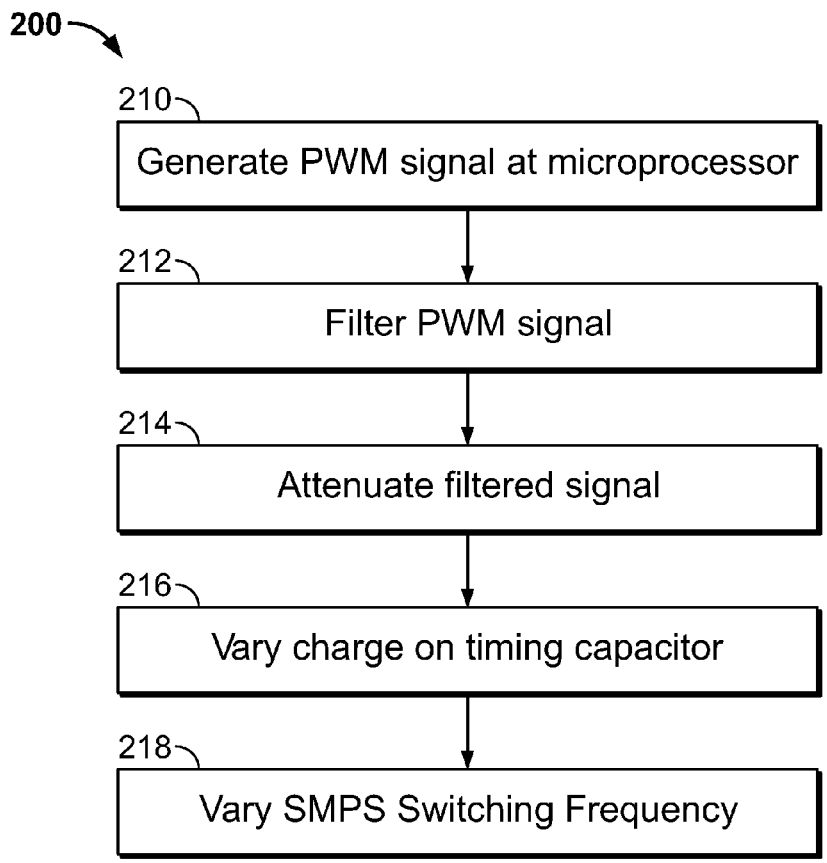
FIG. 2 is a flow chart of a method that includes some of the aspects of the present disclosure.

With continued reference to FIG. 1 and further reference to FIG. 2, the switching frequency of the SMPS controller 110 can be varied by varying the discharge time of the timing capacitor 114. FIG. 2 shows a method 200 of varying the switching frequency in the system 100 of FIG. 1. A microcontroller 120 is configured to generate a PWM signal 122 representative of a dithering signal (block 210 of FIG. 2). The microcontroller 120 can be, for example, Microchip Technology Inc.'s PIC12C671.

The PWM signal 122 is a constant frequency signal, where the duty cycle, or on time, of the signal is varied. The PWM signal 122 periodically increases in duty cycle and then decreases in duty cycle, e.g., from 12.5 percent duty cycle to 87.5 percent duty cycle, and back again to 12.5 percent duty cycle. The increase and decrease can be either linear or non-linear. For example, the PWM signal 122 can include a twelve pulse sequence. Each pulse can be represented by 8 bits, which can be either one or zero. A 12.5 percent duty cycle pulse, for example, would include a single one value followed by seven zero value bits. The twelve-pulse sequence can be represented, for example, as:

| 1 | 0 | 0 | 0 | 0 | 0 | 0 | 0 |
| 1 | 1 | 0 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 1 | 0 | 0 |
| 1 | 1 | 1 | 1 | 1 | 1 | 1 | 0 |
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |

Figure 3:
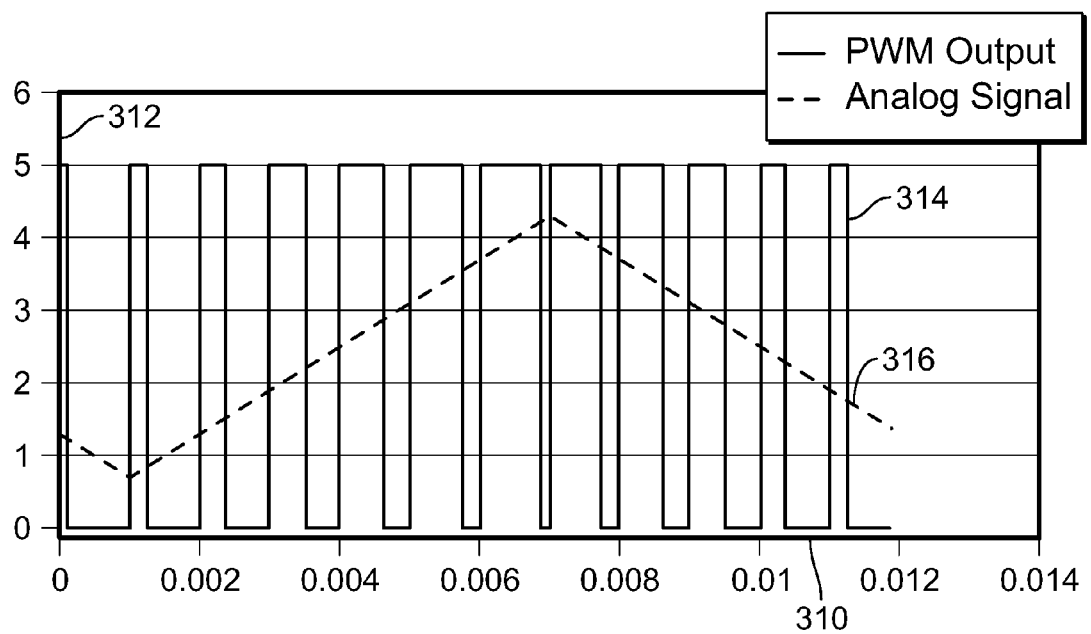
FIG. 3 is a graph of a PWM signal and corresponding analog signal in accordance with some aspects of the present disclosure.

The PWM signal 122 can be interpreted as a digital signal. The PWM signal 122 is converted from a digital signal to an analog signal 126 by a converter 124. For example, the converter 124 can be a low pass filter, and the PWM signal 122 can be filtered by the low pass filter 124 to produce a filtered dithering signal (block 212 of FIG. 2). The low pass filter 124 smoothes out the digital PWM signal 122 and generates the analog signal 126 with a shape determined by the PWM signal. FIG. 3 shows an example PWM signal 314 and the corresponding analog signal 316 together on a graph with time on the x-axis 310 and amplitude on the y-axis. Alternatively, a digital-to-analog converter ("DAC") can be used to generate the analog signal.

The analog signal 126 can be optionally attenuated by an impedance (e.g., a resistor) 128 (Z) coupled to the low pass filter 124 to generate an attenuated analog signal that varies in a voltage range appropriate to vary the charge on the timing capacitor 114 (block 214 of FIG. 2). The impedance 128 can be, for example, a 300 KΩ resistor. The impedance 128 is coupled to the timing capacitor 114 at the node between the timing capacitor 114 and the timing resistor 116. The analog signal 126, through the impedance 128, varies the voltage supplied to the timing capacitor 114, which in turn varies the time it takes the capacitor to discharge to the lower value (block 216 of FIG. 2). Varying the discharge time of the timing capacitor 114 causes the frequency of the SMPS controller 110 to vary accordingly (block 218 of FIG. 2). The analog signal 126 dithers or varies the switching frequency of the SMPS controller 110 within a range, or bandwidth. The switching frequency of the SMPS controller 110 can vary, or be modulated, from a minimum switching frequency $f_{SWmin}$ to a maximum switching frequency $f_{SWmax}$. The bandwidth, then is $f_{SWmax}-f_{SWmin}$. The period of the analog signal 126 is the amount of time it takes the analog signal 126 to cycle the switching frequency through $f_{SWmin}$ to $f_{SWmax}$ and back to $f_{SWmin}$. The frequency of the analog signal 126 is one divided by the period of the analog signal.

Figure 5:
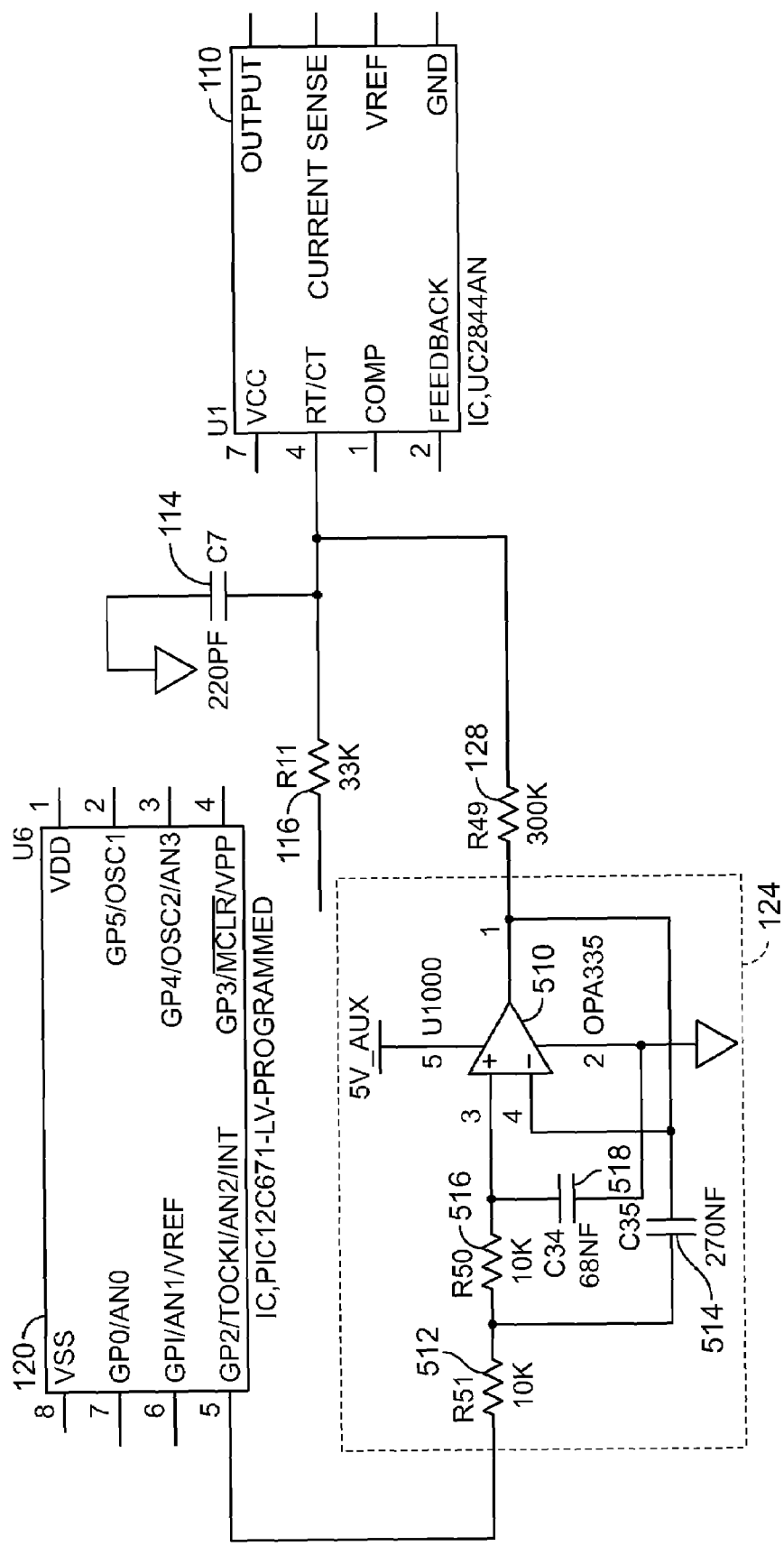
FIG. 5 is a circuit diagram of a system that includes some of the elements used in aspects of the present disclosure.

As shown in FIG. 5, the low pass filter 124 is part of a class D amplifier. A Class D amplifier can produce any arbitrary analog waveform within the bandwidth its the lowpass filter. This allows the digital PWM signal 122 to be conveniently converted into the analog signal 126. More specifically, the low pass filter 124 can include a $2^{nd}$ order Chebyshev filter with a 3 dB point at approximately 100 Hz. To reduce component count a Positive Single Amplifier Biquad (SAB) implementation can be used. The low pass filter 124 can include an operational amplifier ("opamp") 510, for example Texas Instruments Inc.'s OPA335 single supply rail opamp. Resistors 512 and 516, along with capacitors 514 and 518, configure the gain and cutoff frequency of the opamp 510. The resistor 512 can be a 10 KΩ resistor, the resistor 516 can be a 10 KΩ resistor, the capacitor 514 can be a 270 nF capacitor, and capacitor 518 can be a 68 nF capacitor, but other values can be used to set the gain and cutoff frequency of the opamp 510 in other implementations.

The analog signal 126 can be generated to vary the switching frequency of the SMPS controller 110 to meet specific EMI requirements. EMI requirements typically fall into two measurement categories: average and quasi peak. The EMI amplitude of a quasi-peak EMI requirement is generally significantly higher than the EMI amplitude of a corresponding average EMI requirement. An average measurement is typically taken with a spectrum analyzer (not shown) coupled to the electronic device that includes the SMPS. In a typical test set up, for example as specified in CISPR 16 or FCC Part 15, the spectrum analyzer can be coupled to a Line Impedance Stabilizer Network (LISN). The spectrum analyzer can have a 9 kHz resolution bandwidth with an averaging filter. The average filter time constant for the spectrum analyzer can typically be approximately 100 ms and can be very closely approximated by setting a video bandwidth to 10 Hz. For example, CISPR 16 specifies taking average EMI measurements with a spectrum analyzer using a bandwidth of 9 kHz with a time constant of 160 ms.

If the analog signal 126 is swept outside of the resolution bandwidth of the spectrum analyzer (i.e., the bandwidth of the switching frequency of the SMPS is greater than the resolution bandwidth of the spectrum analyzer), the average EMI measured by the spectrum analyzer can be reduced by approximately:

20*Log(Sweep_Bandwidth/9 kHz)

where Sweep_Bandwidth is the bandwidth of the switching frequency.

Because the average filter time constant of the spectrum analyzer is approximately 100 ms (e.g., 160 ms for CISPR 16), the period of the frequency sweeping waveform must be much less than 100 ms (the frequency must be much more than 10 Hz). This is because dithering inside of this bandwidth will be considered by the spectrum analyzer to be the same as the nominal frequency of the SMPS controller 110. For example, the switching frequency bandwidth of the power supply can be 10 kHz with a frequency of 87 Hz.

Figure 4:
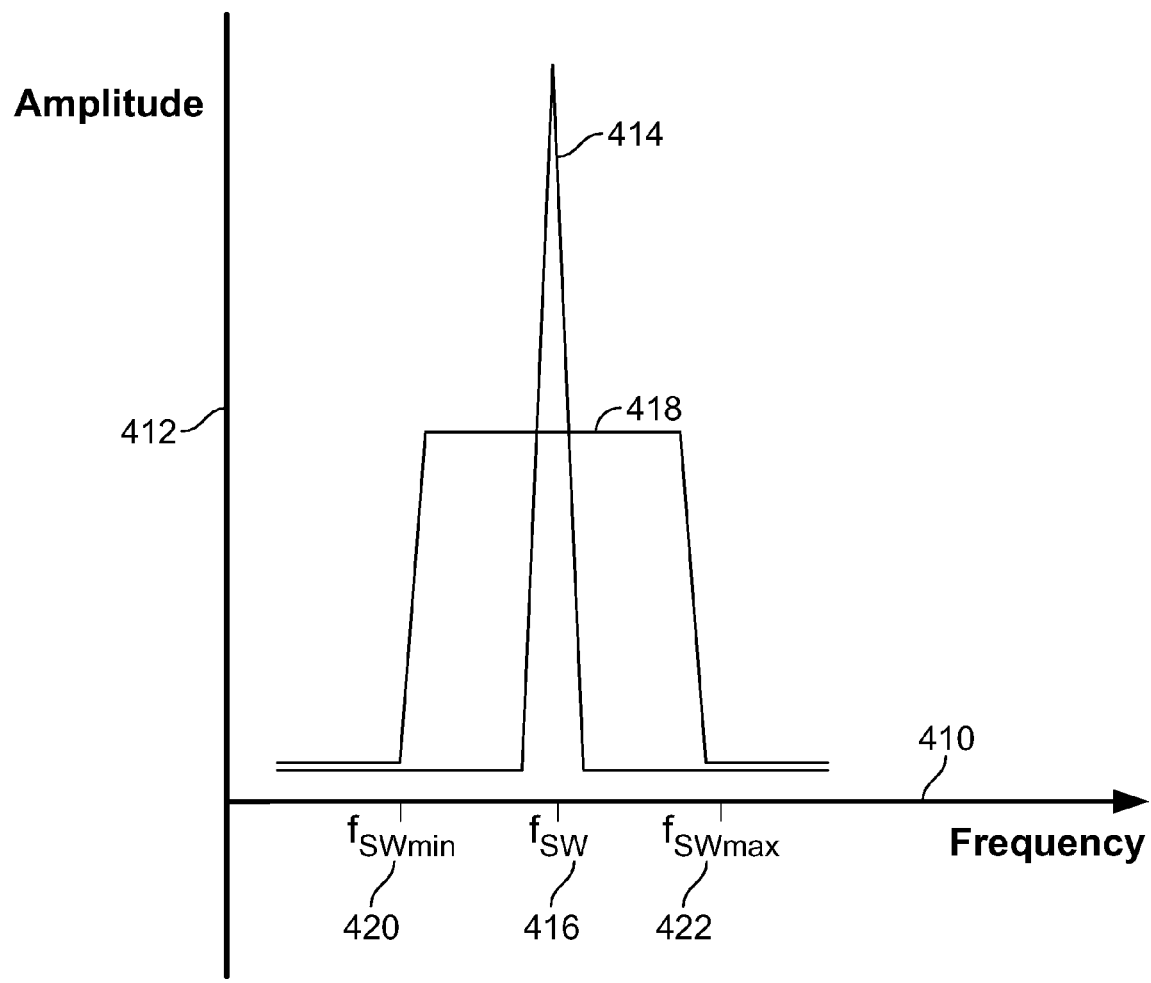
FIG. 4 is a graph of EMI emissions profiles in accordance with some aspects of the present disclosure.

FIG. 4 illustrates the effect, on measured EMI, of applying the analog signal 126 through the impedance 128 to the timing capacitor 114 and timing resistor 116 coupled to the SMPS controller 110. The spike-shaped trace 414 shows an emission spectrum of a SMPS including the SMPS controller 110 and the switch 112 without the analog signal 126 applied. The spike-shaped trace 414 shows the amplitude of the emissions (shown on the y-axis 412) for certain frequency values (shown on the x-axis 416). The peak value of the spike-shaped trace 414 corresponds to the fundamental switching frequency of the SMPS controller 110. The flat trace 418 shows the result of applying the analog signal 126 through the impedance 128 to the timing capacitor 114 and timing resistor 116 coupled to the SMPS controller 110. As can be seen, the flat trace 418 shows a maximally-flat emissions spectrum between the $f_{SWmin}$ frequency value 420 and the $f_{SWmax}$ frequency value 422. The $f_{SWmin}$ frequency value 420 and the $f_{SWmax}$ frequency value 422 are the outer edges of the bandwidth of the analog signal 126. For example $f_{SWmin}$ can be −5 kHz and $f_{SWmax}$ can be +5 kHz for a bandwidth of 10 kHz. The amplitude of the flat trace 418 is much lower than the amplitude of the spike-shaped trace 414. Thus, the amplitude of the emissions while the analog signal is used is much lower than the amplitude of the emissions when the analog signal is not used.

What has been shown is that the conducted emissions, or EMI, of a power supply such as a SMPS can be reduced by varying the switching frequency of the power supply. Specifically, the microcontroller 120 can generate a PWM signal 122 that is filtered using a low-pass filter 128 to generate an analog signal 126. The analog signal varies the charge on a timing capacitor 114 to vary the switching frequency. The characteristics of the EMI can be changed from an amplitude exceeding requirements in narrow frequency ranges to a maximally flat profile in a bandwidth range around the fundamental switching frequency. The shape of the analog signal, for example the sawtooth shape, is such that the analog signal does not sharply transition from $f_{SWmax}$ to $f_{SWmin}$. Moreover, the analog signal is shaped to reduce dwell times at the $f_{SWmax}$ and $f_{SWmin}$ frequencies. Using an analog signal with these characteristics produces a maximally flat EMI profile. Moreover, because a microprocessor is used to generate the PWM signal, the PWM signal can be programmed to be a variety of different waveforms when filtered, with different shapes, bandwidths, and frequencies. Thus, the characteristics of the analog signal that varies the charge on the timing capacitor easily can be changed by programming the microcontroller, without the need to change circuit components.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. An apparatus for varying the timing of a switch-mode power supply (SMPS), the apparatus comprising:
   a microcontroller configured to output a first pulse width modulated (PWM) signal; and
   a converter coupled to the microcontroller and configured to receive the first PWM signal and output an analog signal to a SMPS timing capacitor coupled to a SMPS, wherein the SMPS timing capacitor is configured to discharge at a rate that determines a switching frequency of the SMPS;
   wherein the converter is configured to generate the analog signal to vary the discharge time of the timing capacitor to vary switching frequency of the SMPS.

2. The apparatus of claim 1, wherein the converter comprises a low-pass filter.

3. The apparatus of claim 1, wherein the converter comprises a class D amplifier with an average time constant of approximately 100 ms.

4. The apparatus of claim 1, wherein the analog signal comprises a sawtooth signal.

5. The apparatus of claim 1, wherein the analog signal is a periodic signal, the period of the analog signal being less than 100 ms.

6. The apparatus of claim 1, wherein the variation of the SMPS switching frequency has a bandwidth equal to the difference between a maximum switching frequency and a minimum switching frequency, the bandwidth of the switching frequency variation being greater than 9 kHz;
   and wherein the period of the analog signal is less than 160 ms.

7. The apparatus of claim 1, wherein the controller is configured to output the first PWM signal according to a bitstream comprising:

| | | | | | | | |
|---|---|---|---|---|---|---|---|
| 1 | 0 | 0 | 0 | 0 | 0 | 0 | 0 |
| 1 | 1 | 0 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 1 | 0 | 0 |
| 1 | 1 | 1 | 1 | 1 | 1 | 1 | 0 |
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0. |

8. The apparatus of claim 1, further comprising an impedance coupled to the converter, the impedance configured to receive the analog signal and output to the timing capacitor an attenuated analog signal.

9. The apparatus of claim 1, wherein the converter is a digital to analog converter.

10. A method of varying the timing of a switch-mode power supply (SMPS), the method comprising:
    discharging a SMPS timing capacitor to set a switching frequency of the SMPS;
    outputting a pulse width modulated (PWM) signal to a converter;
    at the converter, converting the PWM signal to an analog signal;

receiving the analog signal at the SMPS timing capacitor;

varying the discharge time of the SMPS timing capacitor by varying the charge on the SMPS timing capacitor with the analog signal; and causing the switching frequency of the SMPS to be modified by the varying of the discharge time of the SMPS timing capacitor.

11. The method of claim 10, wherein converting the PWM signal comprises filtering the PWM signal with a low-pass filter.

12. The method of claim 11, wherein the low-pass filter comprises a class D amplifier and wherein the average time constant of the low pass filter is approximately 100 ms.

13. The method of claim 10, wherein the analog signal is a sawtooth signal.

14. The method of claim 10, wherein the analog signal is a periodic signal, the period of the analog signal being less than 100 ms.

15. The method of claim 10, wherein the variation of the SMPS switching frequency has a bandwidth equal to the difference between a maximum switching frequency and a minimum switching frequency, the bandwidth of the switching frequency variation being greater than 9 kHz;

and wherein the period of the analog signal is less than 160 ms.

16. The method of claim 10, wherein the PWM signal is generated by a microcontroller and is represented by a bitstream comprising:

| 1 | 0 | 0 | 0 | 0 | 0 | 0 | 0 |
|---|---|---|---|---|---|---|---|
| 1 | 1 | 0 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 1 | 0 | 0 |
| 1 | 1 | 1 | 1 | 1 | 1 | 1 | 0 |
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0. |

17. The method of claim 10, further comprising attenuating the analog signal with an impedance.

18. The method of claim 10, wherein converting the PWM signal comprises using a digital to analog converter.

19. A system comprising:

a microcontroller configured to output a first pulse width modulated (PWM) signal;

a converter coupled to the microcontroller and configured to receive the first PWM signal and output an analog signal;

a timing capacitor coupled to the converter and responsive to the analog signal, wherein the converter is configured to output the analog signal to the timing capacitor to vary the discharge time of the timing capacitor by varying the charge on the timing capacitor; and a switch-mode power supply (SMPS) coupled to the timing capacitor configured to monitor the charge on the timing capacitor and vary the frequency of a second PWM signal in response to the charge on the timing capacitor.

20. The system of claim 19, wherein:

the converter comprises a low pass filter having a time constant of approximately 100 ms; and the analog signal is a sawtooth signal.

21. The system of claim 19, wherein the analog signal is a periodic signal, the period of the analog signal being less than 100 ms.

22. The system of claim 19, wherein the variation of the SMPS switching frequency has a bandwidth equal to the difference between a maximum switching frequency and a minimum switching frequency, the bandwidth of the switching frequency being greater than 9 kHz and the period of the switching frequency dithering is less than 160 ms.

23. The system of claim 19, wherein the first PWM signal is produced by a function generating a bit stream comprising:

| 1 | 0 | 0 | 0 | 0 | 0 | 0 | 0 |
|---|---|---|---|---|---|---|---|
| 1 | 1 | 0 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 1 | 0 | 0 |
| 1 | 1 | 1 | 1 | 1 | 1 | 1 | 0 |
| 1 | 1 | 1 | 1 | 1 | 1 | 0 | 0 |
| 1 | 1 | 1 | 1 | 1 | 0 | 0 | 0 |
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0. |

24. The system of claim 19, further comprising an impedance configured to attenuate the analog signal.

* * * * *